US012584840B2

(12) United States Patent
Ohdaira

(10) Patent No.: US 12,584,840 B2
(45) Date of Patent: Mar. 24, 2026

(54) MEASURING METHOD AND MEASURING SYSTEM FOR MICROBUBBLE DISPERSION LIQUID

(71) Applicant: OHDAIRA LABORATORY COMPANY, Kumagaya (JP)

(72) Inventor: Takeshi Ohdaira, Kumayaga (JP)

(73) Assignee: OHDAIRA LABORATORY COMPANY, Kumagaya (JP)

( * ) Notice: Subject to any disclaimer, the term of this patent is extended or adjusted under 35 U.S.C. 154(b) by 329 days.

(21) Appl. No.: 18/558,650

(22) PCT Filed: May 7, 2021

(86) PCT No.: PCT/JP2021/017600
§ 371 (c)(1),
(2) Date: Jan. 3, 2024

(87) PCT Pub. No.: WO2022/234680
PCT Pub. Date: Nov. 10, 2022

(65) Prior Publication Data
US 2024/0295483 A1    Sep. 5, 2024

(51) Int. Cl.
*G01N 15/02*          (2024.01)
*G01N 15/0205*       (2024.01)
*G01N 15/0227*       (2024.01)

(52) U.S. Cl.
CPC ..... *G01N 15/0211* (2013.01); *G01N 15/0227* (2013.01)

(58) Field of Classification Search
CPC ........... G01N 15/0211; G01N 15/0227; G01N 15/075; G01N 2015/0011;
(Continued)

(56) References Cited

U.S. PATENT DOCUMENTS

2015/0369722 A1    12/2015    Donner
2021/0244021 A1     8/2021    Ohdaira

FOREIGN PATENT DOCUMENTS

CN          104596898 A       5/2015
CN          110832301    *    5/2018
(Continued)

OTHER PUBLICATIONS

International Search Report and Written Opinion received for PCT/JP2021/017600, mailed Jul. 13, 2021.
(Continued)

*Primary Examiner* — Rebecca C Bryant
(74) *Attorney, Agent, or Firm* — Greer, Burns & Crain, Ltd

(57) ABSTRACT

A measuring method and a measuring system of a microbubble dispersion liquid for measuring characteristics of the microbubble dispersion liquid while distinguishing between fine particles and differentiating them into microbubbles and solid particles is disclosed. A measuring system measures characteristics of a microbubble dispersion liquid under test, and the system includes a microcapillary holding the liquid under test, a laser device irradiating the liquid under test inside the microcapillary with laser light, a magnetic device that applies a time-varying magnetic field to the liquid under test within the irradiation area with laser light, a digital microscope detecting scattered light generated from fine particles contained in the liquid under test by irradiation with laser light, and a measurement device that measures characteristics of the test liquid by distinguishing between the fine particles and differentiating them into microbubbles and solid particles based on the brightness of scattered light detected by the microscope.

15 Claims, 10 Drawing Sheets

(58) Field of Classification Search
CPC ... G01N 2015/0053; G01N 2015/1026; G01N
15/0266
See application file for complete search history.

(56) References Cited

FOREIGN PATENT DOCUMENTS

| | | | |
|----|-----------------|---|---------|
| DE | 102008009494 | * | 8/2009 |
| JP | 2016048185 A | | 4/2016 |
| JP | 2017198468 A | | 11/2017 |
| JP | 2020079774 A | | 5/2020 |

OTHER PUBLICATIONS

Hata, T., et al., "Ultra-fine Bubbles that use Sonoluminescence Enhancement Effect," Bunseki Kagaku, vol. 68, No. 11, Nov. 2019, pp. 847-852.
Shimaoka, H., "Measurement Technologies for Fine Bubbles," Journal of the Surface Finishing Society of Japan, Jun. 2017, vol. 68, No. 6, pp. 326-330.

* cited by examiner

(Calculation of concentration and particle size distribution)

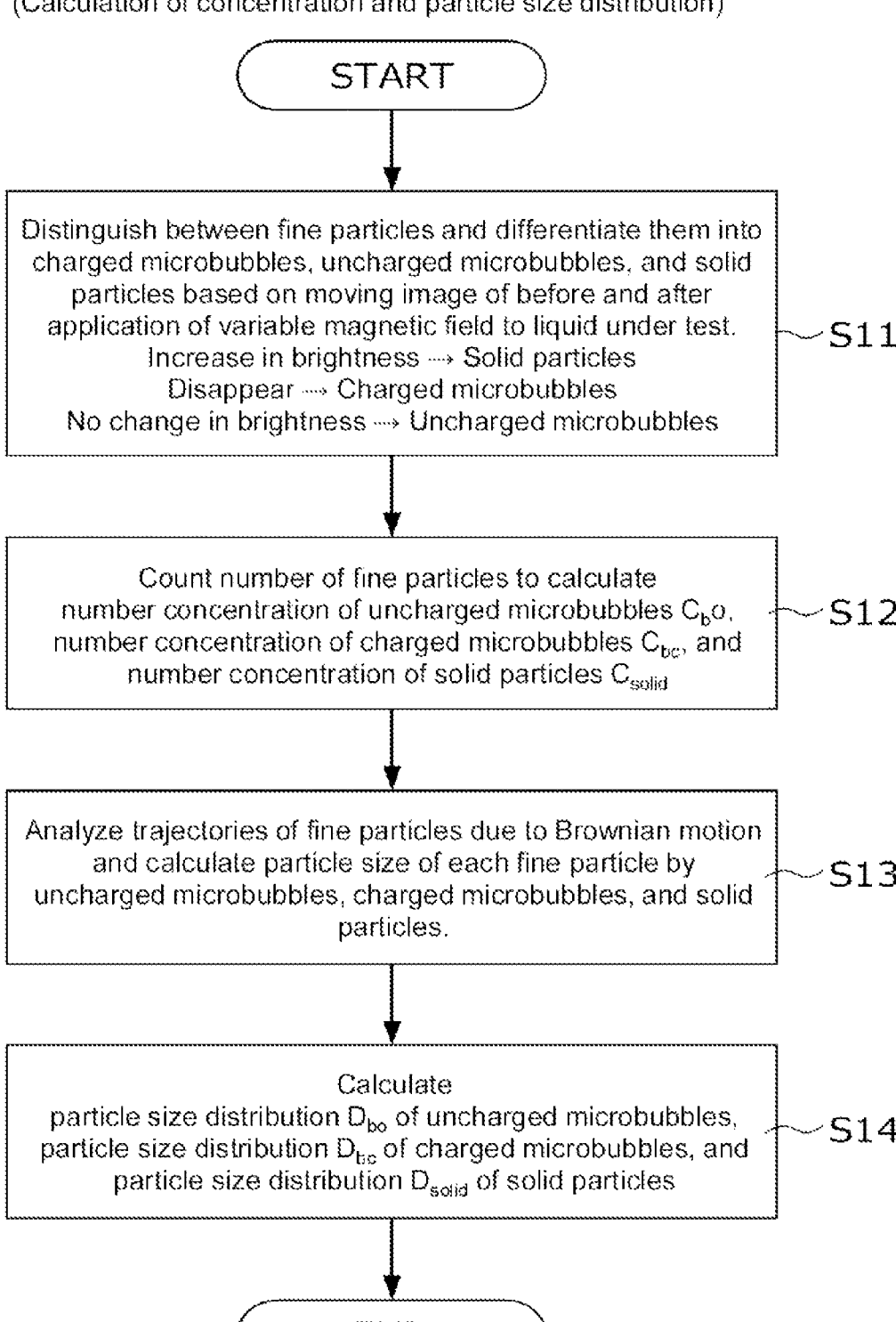

START

Distinguish between fine particles and differentiate them into charged microbubbles, uncharged microbubbles, and solid particles based on moving image of before and after application of variable magnetic field to liquid under test.
Increase in brightness ⟶ Solid particles
Disappear ⟶ Charged microbubbles
No change in brightness ⟶ Uncharged microbubbles
~S11

Count number of fine particles to calculate number concentration of uncharged microbubbles $C_bo$, number concentration of charged microbubbles $C_{bc}$, and number concentration of solid particles $C_{solid}$
~S12

Analyze trajectories of fine particles due to Brownian motion and calculate particle size of each fine particle by uncharged microbubbles, charged microbubbles, and solid particles.
~S13

Calculate particle size distribution $D_{bo}$ of uncharged microbubbles, particle size distribution $D_{bc}$ of charged microbubbles, and particle size distribution $D_{solid}$ of solid particles
~S14

END

FIG. 10

Map for calculating particle size of solid particles

| | | Viscosity coefficient of medium | | | |
|---|---|---|---|---|---|
| | | v1 | v2 | ⋯ | vm |
| Magnitude of change in brightness of scattered light | ΔL1 | a11 | a12 | ⋯ | a1m |
| | ΔL2 | a21 | a22 | ⋯ | ⋯ |
| | ⋯ | ⋯ | ⋯ | ⋯ | ⋯ |
| | ΔLn | an1 | an2 | ⋯ | anm |

MEASURING METHOD AND MEASURING SYSTEM FOR MICROBUBBLE DISPERSION LIQUID

BACKGROUND

Technical Field

The present invention relates to a measuring method and a measuring system for a microbubble dispersion liquid. More specifically, the present invention relates to a measuring method and a measuring system for measuring the characteristics of a microbubble dispersion liquid containing microbubbles.

Research has investigated the application of a microbubble dispersion liquid containing microbubbles to various industrial fields. Among microbubbles, those microbubbles having a particle size of nano-order (hereinafter "nano-level diameter bubbles") have a characteristic of staying in water for a long period of time (for example, several years) because the motion thereof in a dispersion liquid is mainly Brownian motion. For this reason, microbubble dispersion liquids in which nano-level diameter bubbles are dispersed have been widely researched. See, for example, Patent Document 1 (Japanese Unexamined Patent Application Publication No. 2019-103958).

The presence or absence of microbubbles in a microbubble dispersion liquid can be confirmed relatively easily by whether the liquid is clouded or not. In contrast, since the particle size of the nano-level diameter bubbles is about the same as or smaller than the wavelength of light, the presence or absence of the nano-level diameter bubbles in a microbubble dispersion liquid cannot be confirmed visually.

Further, techniques such as a dynamic light scattering method and a particle trajectory tracking method are known as techniques to optically measure the concentration and particle size distribution of fine particles that perform Brownian motion in a dispersion liquid containing nano-order fine particles mentioned above. In the dynamic light scattering method, and the particle trajectory tracking method, the concentration and particle size distribution of fine particles are measured such that a liquid in which fine particles are dispersed is irradiated with laser light, and the scattered light from the fine particles is tracked.

PRIOR-ART DOCUMENT

Patent Document

[Patent Document 1] Japanese Unexamined Patent Application Publication No. 2019-103958

SUMMARY

Technical Problem

There are cases where a microbubble dispersion liquid contains not only nano-level diameter bubbles but also nano-order fine solid particles as impurities. However, although the conventional method for measuring fine particles in a liquid in which fine particles are dispersed can identify nano-order fine particles in the liquid, the method cannot distinguish nano-level diameter bubbles from solid particles.

An objective of the present invention is to provide a measuring method and a measuring system that can distinguish between fine particles in a dispersion liquid and differentiate them into microbubbles and solid particles so as to properly measure the characteristics of a microbubble dispersion liquid.

Solution to Problem (1) A method for measuring a microbubble dispersion liquid according to the present invention is a method to measure characteristics of a liquid under test, which is a microbubble dispersion liquid, wherein the method includes the steps of irradiating the liquid under test that is held by a holding device with an illumination light, applying a time-varying magnetic field to the liquid under test within an irradiation area with the illumination light, detecting scattered light generated from fine particles contained in the liquid under test by emission of the illumination light using a light detection device; and distinguishing between the fine particles and differentiating them into microbubbles and solid particles based on brightness of the scattered light detected by the light detection device.

(2) In this case, it is preferable that the liquid under test contains microbubbles having a particle size in the range of 2 nm or more and less than 2000 nm.

(3) In this case, it is preferable that the fine particles are identified as solid particles and microbubbles by comparing brightness thereof with a predetermined threshold using an image of the fine particles obtained by the light detection device.

(4) In this case, it is preferable that in the step of detecting scattered light, an image of trajectories of the fine particles due to Brownian motion is obtained by detecting scattered light by the light detection device before and after applying a variable magnetic field, and wherein in the image obtained by the light detection device, the fine particles are identified as solid particles and microbubbles based on whether their brightness have been increased or not when the variable magnetic field was applied to the liquid.

(5) In this case, it is preferable that in the image obtained by the light detection device, the fine particles whose brightness have increased when the variable magnetic field was applied to the liquid are identified as solid particles, the fine particles that have disappeared when the variable magnetic field was applied to the liquid are identified as charged microbubbles, and the fine particles whose brightness have not increased when the variable magnetic field was applied to the liquid are identified as uncharged microbubbles.

(6) In this case, it is preferable that the measuring method further includes measuring solid particles in which at least any of concentration and particle size distribution of solid particles contained in the liquid under test is calculated based on an image obtained by the light detection device.

(7) In this case, it is preferable that the measuring method further includes measuring uncharged microbubbles in which at least any of concentration and particle size distribution of uncharged microbubbles contained in the liquid under test is calculated based on an image obtained by the light detection device.

(8) In this case, it is preferable that the measuring method further includes measuring charged microbubbles in which in the step of detecting scattered light, both are obtained of the before-application image of trajectories of the fine particles due to Brownian motion before the variable magnetic field is applied to the liquid, and the during-application image of trajectories of the fine particles due to Brownian motion while the variable magnetic field is applied to the liquid, and at least any of concentration and particle size distribution of the charged microbubbles contained in the liquid under test is calculated based on those images.

(9) In this case, it is preferable that the measuring method further includes performing a first screening of the liquid under test in which before the liquid under test is held by the holding device, the liquid under test has been passed through a positively charged filter.

(10) In this case, it is preferable that based on the magnitude of the change in brightness of scattered light when the variable magnetic field is applied to the liquid, the particle size of the solid particles is calculated using an image of the fine particles obtained by the light detection device.

(11) In this case, it is preferable that the measuring method further includes applying an electric field to the liquid under test in which the electric field is applied to the liquid under test within the irradiation area with the illumination light, wherein in the step of detecting scattered light, a during-application image is obtained of trajectories of the fine particles due to electrophoresis while the electric field is applied to the liquid, and the properties of the solid particles contained in the liquid under test are measured based on the during-application image.

(12) In this case, it is preferable that the measuring method further includes performing a second screening in which before the variable magnetic field is applied to the liquid under test, a static magnetic field is applied to the liquid, by which at least a portion of the solid particles is moved out of the irradiation area.

(13) In this case, it is preferable that the measuring method further includes measuring an amount of paramagnetic substance in which the amount of paramagnetic solid particles is measured, the solid particles being collected in the step of performing the second screening by applying the static magnetic field to the liquid under test.

(14) In this case, it is preferable that a light source of the illumination light is a laser device, and the laser device is capable of switching the wavelength of laser light L by using two or more wavelength values defined within a range of 300 nm or more and less than 700 nm.

(15) A measuring system for measuring a microbubble dispersion liquid according to the present invention is a system to measure characteristics of a liquid under test, which is a microbubble dispersion liquid, wherein the system includes a holding device that holds a liquid under test, a light source that irradiates the liquid under test held by the holding device with illumination light, a variable magnetic field applying device that applies a time-varying magnetic field to the liquid under test within an irradiation area with the illumination light, a light detection device that detects scattered light generated from fine particles contained in the liquid under test by irradiation with the illumination light; and a measuring device that measures characteristics of the liquid under test by distinguishing between the fine particles and differentiating them into microbubbles and solid particles based on brightness of the scattered light that was detected by the light detection device.

Advantageous Effects of the Invention (1) The measuring method of a microbubble dispersion liquid according to the present invention includes the steps of irradiating the liquid under test that is held by a holding device with an illumination light, applying a time-varying magnetic field to the liquid under test within an irradiation area with the illumination light, and detecting scattered light generated from fine particles contained in the liquid under test by emission of the illumination light using a light detection device. As described above, the liquid under test, which is a microbubble dispersion liquid, may contain fine solid particles besides microbubbles. If a variable magnetic field is applied to such a liquid under test, the solid particles that have a biased magnetic permeability undergo larger rotational or translational moment of force under a variable magnetic field compared to spherical particles that have the center of gravity in the center thereof in terms of a magnetic permeability, so that the former rotates on their axes. In contrast, microbubbles, which are spherical particles having the center of gravity in the center thereof in terms of a magnetic permeability, undergo smaller rotational or translational moment of force under a variable magnetic field compared to solid particles. In addition, the microbubbles, which have almost no magnetic permeability, have a very small weight compared with solid particles, which results in very large viscous resistance to the surrounding medium, whereby the microbubbles hardly rotate on their axes. When the liquid under test to which a variable magnetic field is applied is irradiated with the illumination light, the brightness of the scattered light by solid particles rotating on their axes increases more than that of the microbubbles not rotating on their axes. Therefore, the measuring method of the present invention distinguishes between microbubbles and solid particles in a liquid under test based on brightness of scattered light detected by a light detection device. Accordingly, the measuring method of the present invention can measure the characteristics of the liquid under test with high accuracy while distinguishing between fine particles contained in a liquid under test and differentiating them into microbubbles and solid particles.

(2) The measuring method of the present invention measures the liquid under test containing microbubbles having a particle size in the range of 2 nm or more and less than 2000 nm. As described above, known measuring methods cannot distinguish between nano-level diameter bubbles and solid particles having a similar particle size. In contrast, even if a microbubble dispersion liquid contains solid particles having the particle size similar to that of nano-level diameter bubbles, the measuring method of the present invention can measure the characteristics of the liquid under test with high accuracy while distinguishing between those solid particles and nano-level diameter bubbles.

(3) The measuring method of the present invention distinguishes between fine particles into solid particles and microbubbles by comparing brightness thereof with a predetermined threshold using an image of the fine particles obtained by the light detection device. This makes it possible to distinguish between the fine particles and differentiate them into solid particles and microbubbles by a simple method.

(4) In the measuring method of the present invention, in the step of detecting scattered light, an image of trajectories of fine particles due to Brownian motion is obtained by detecting scattered light by the light detection device before and after applying a variable magnetic field to the liquid under test, and in the image obtained by the light detection device, the fine particles are distinguished between solid particles and microbubbles based on whether their brightness have been increased or not when the variable magnetic field was applied to the liquid. Because of this, the method can distinguish whether fine particles are solid particles or microbubbles while tracking the movement of the fine particles due to Brownian motion.

(5) The fine particles contained in the microbubble dispersion liquid are divided into fine solid particles and microbubbles, and the microbubbles are divided into positively or negatively charged microbubbles and non-charged microbubbles with little or no charge. As described above, if a variable magnetic field is applied to the liquid under test, the solid particles that have a biased magnetic permeability rotate on their axes, the charged microbubbles disappear, and the uncharged microbubbles do not rotate on their axes. Using this, in the measuring method according to the present invention, the fine particles whose brightness have increased when the variable magnetic field was applied are identified as solid particles, the fine particles that have disappeared when the variable magnetic field was applied to the liquid are identified as charged microbubbles, and the fine particles whose brightness have not increased when the variable magnetic field was applied to the liquid are identified as uncharged microbubbles. Thus, the measuring method of the present invention can measure the characteristics of the liquid under test with high accuracy while distinguishing between the fine particles contained in the liquid under test and differentiating them into solid particles, charged microbubbles, and uncharged microbubbles.

(6) The measuring method of the present invention includes the step of measuring solid particles in which at least any of concentration and particle size distribution of solid particles contained in the liquid under test is calculated based on an image obtained by the light detection device. Thus, the measuring method of the present invention can measure the concentration and/or particle size distribution of solid particles with high accuracy while distinguishing the solid particles from microbubbles.

(7) The measuring method of the present invention includes the step of measuring uncharged microbubbles in which at least any of concentration and particle size distribution of uncharged microbubbles contained in the liquid under test is calculated based on an image obtained by the light detection device. Thus, the measuring method of the present invention can measure the concentration and/or particle size distribution of uncharged microbubbles with high accuracy while distinguishing the uncharged microbubbles from solid particles and charged microbubbles.

(8) In the measuring method of the present invention, in the step of detecting scattered light, both are obtained of the before-application image of trajectories of the fine particles due to Brownian motion before the variable magnetic field is applied to the liquid under test, and the during-application image of trajectories of the fine particles due to Brownian motion while the variable magnetic field is applied to the liquid under test. The measurement method of the present invention also includes the step of measuring charged microbubbles in which at least any of concentration and particle size distribution of the charged microbubbles contained in the liquid under test is calculated based on those images. Thus, the measuring method of the present invention can measure the concentration and/or particle size distribution of the charged microbubbles with high accuracy while distinguishing the charged microbubbles from solid particles and uncharged microbubbles.

(9) In Patent Document 1 (Japanese Unexamined Patent Application Publication No. 2019-103958) filed by the applicant, the applicant has confirmed that among the fine particles in a microbubble dispersion liquid, positively charged microbubbles especially have the effect of promoting plant growth. In contrast, in the measuring method of the present invention, before the liquid under test is held by the holding device, the liquid under test has been passed through a positively charged filter. As a result, because the negatively charged microbubbles have been removed from among charged microbubbles contained in the liquid under test, the measuring method of the present invention can measure the concentration and/or particle size distribution of positively charged microbubbles with high accuracy.

(10) The number of rotations of solid particles when a variable magnetic field is applied to the liquid under test correlates with the magnitude of change in the brightness of scattered light. The number of rotations of solid particles when a variable magnetic field is applied to the liquid also correlates with the particle size of the solid particles. Therefore, the present invention calculates the particle size of solid particles by using the correlation between the magnitude of change in the brightness of scattered light and the particle size of the solid particles as described above, and based on the magnitude of the change in brightness of scattered light using an image of the fine particles obtained by the light detection device. Thus, the measuring method of the present invention can measure the particle size of solid particles in a simple way.

(11) The measuring method of the present invention obtains an image of trajectories of fine particles due to electrophoresis while an electric field is applied to the liquid under test within the irradiation area with the illumination light, and measures the properties of the solid particles contained in the liquid under test. Thus, the measuring method of the present invention can measure the electrical characteristics of solid particles.

(12) The measuring method of the present invention moves at least a portion of the solid particles out of the irradiation area by applying a static magnetic field to the liquid under test before applying a variable magnetic field to the liquid. This makes it possible to move paramagnetic solid particles among numerous solid particles contained in the liquid under test out of the irradiation area, which further improves measurement accuracy.

(13) As described above, the measuring method of the present invention moves paramagnetic solid particles out of the irradiation area by applying a static magnetic field, and collects the particles to measure the amount of paramagnetic solid particles. This makes it possible to measure the amount of the paramagnetic solid particles contained in the liquid under test in a simple way.

(14) The number of rotations of solid particles when a variable magnetic field is applied to the liquid under test varies depending on the physical properties and shape of the solid particles, and the viscosity of the medium. The brightness of the scattered light varies depending on the number of rotations of solid particles and the wavelength of the irradiated light. Therefore, if the wavelength of the irradiated light is fixed, the brightness of the scattered light may be insufficiently increased or saturated. In contrast, the present invention uses a laser device that can switch the wavelength of laser light by using multiple wavelength values defined within a range of 300 nm or more and less than 700 nm as a light source of irradiated light. Thus, if the brightness of scattered light cannot be properly measured due to insufficient increase or saturation of the brightness, the wavelength of the laser light can be switched accordingly, by which the brightness of scattered light can be properly measured.

(15) A measuring system of a microbubble dispersion liquid of the present invention includes a holding device that holds a liquid under test, a light source that irradiates the liquid under test held by the holding device with an illumination light, a variable magnetic field applying device that applies a time-varying magnetic field to the liquid under test within an irradiation area with the illumination light, a light detection device that detects scattered light generated from fine particles contained in the liquid under test by irradiation with the illumination light, and a measuring device that measures characteristics of the liquid under test by distinguishing between the fine particles and differentiating them into microbubbles and solid particles based on brightness of the scattered light that was detected by the light detection device. Thus, for the same reason as that for the invention included in (1) of this section, the measuring system can measure the characteristics of the liquid under test with high accuracy while distinguishing between fine particles contained in the liquid under test and differentiating them into microbubbles and solid particles.

BRIEF DESCRIPTION OF THE DRAWINGS

FIG. 5 is a flowchart showing a procedure for calculating the concentration and the particle size distribution of fine particles using a measuring device.

FIG. 10 is an example of a map for calculating the particle size of solid particles.

DETAILED DESCRIPTION

First Embodiment

Figure 1:
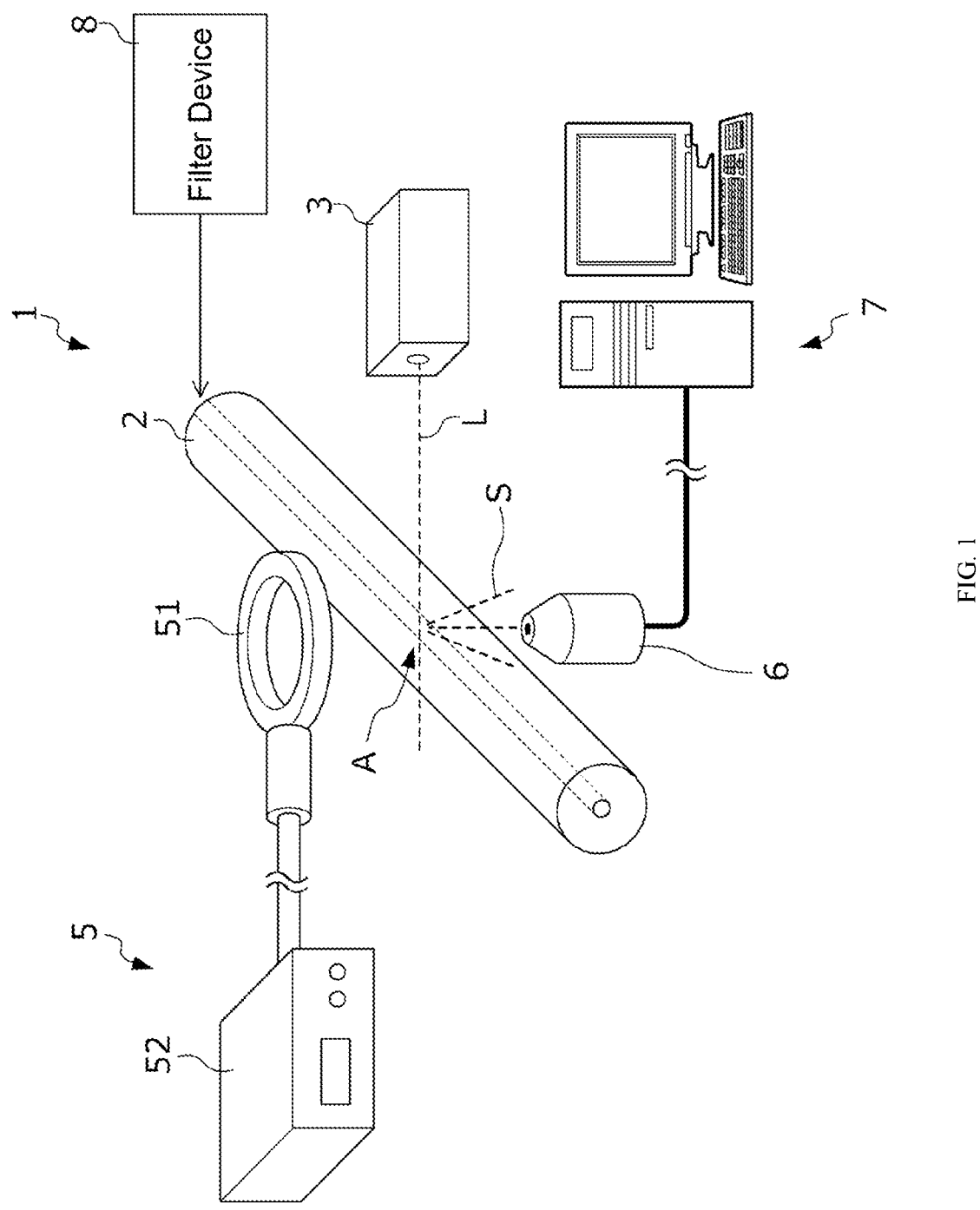
FIG. 1 is a diagram showing schematically a configuration of a measuring system for a microbubble dispersion liquid according to the First Embodiment of the present invention.

Hereinafter, a configuration of a measuring system 1 will be described in detail with reference to the drawings, in which a measuring method for a microbubble dispersion liquid according to the First Embodiment is applied to the measuring system 1.

The measuring system 1 is to be used to measure the characteristics of a liquid under test, which is a microbubble dispersion liquid of a fluid medium in which microbubbles are dispersed. The characteristics are, for example, the particle size distribution and the number concentration of microbubbles dispersed in the liquid under test. As described hereinafter, the liquid under test to be examined is a nanobubble dispersion liquid in which microbubbles and solid particles having a particle size in the range of 2 nm or more and less than 2000 nm are dispersed in a medium. Hereinafter, microbubbles and solid particles are also referred to collectively as fine particles. Further, the medium used is pure water or NaCl solution, but the mediums to be used are not limited to these in the present invention. In addition, in measuring system 1 described hereinafter, in the case where the medium used is purified water in which no inorganic ions are present, the particle size of fine particles can be calculated with particularly high accuracy, but the medium is not limited to purified water in the present invention. The medium to be used may be any fluid as long as fine bubbles can be dispersed in the fluid.

Measuring system 1 includes a microcapillary 2 as a holding device to hold a liquid under test, a laser device 3 as a light source that irradiates the liquid under test in microcapillary 2 with laser light L as the illumination light, a variable magnetic field applying device 5 that applies a variable magnetic field to the liquid under test in irradiation area A with laser light L, a digital microscope 6 as a light detection device that detects scattered light S generated from fine particles contained in the liquid under test by irradiation with laser light L, a measuring device 7, which is a computer that measures the characteristics of the liquid under test based on an image data obtained by digital microscope 6, and a filter device 8 that filters out impurities and other substances contained in the liquid under test.

Figure 2A:
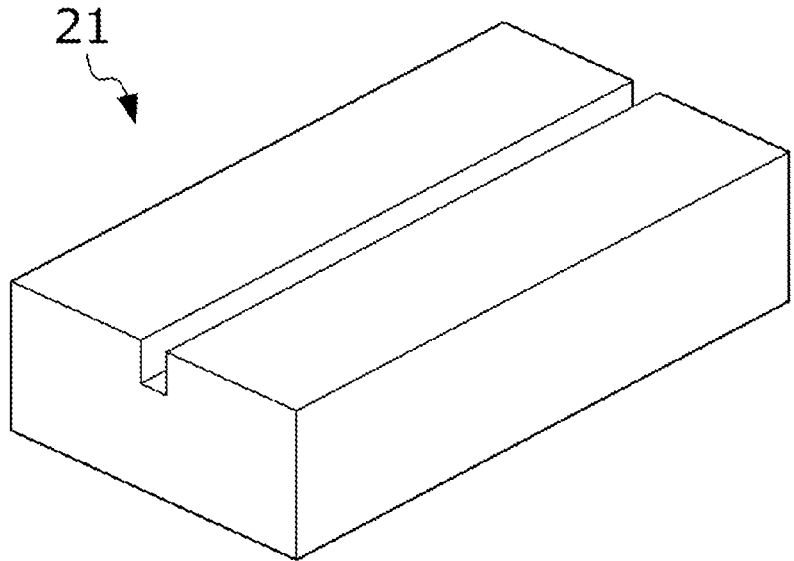
FIG. 2A is a perspective view showing another example of a holding device.
Figure 2B:
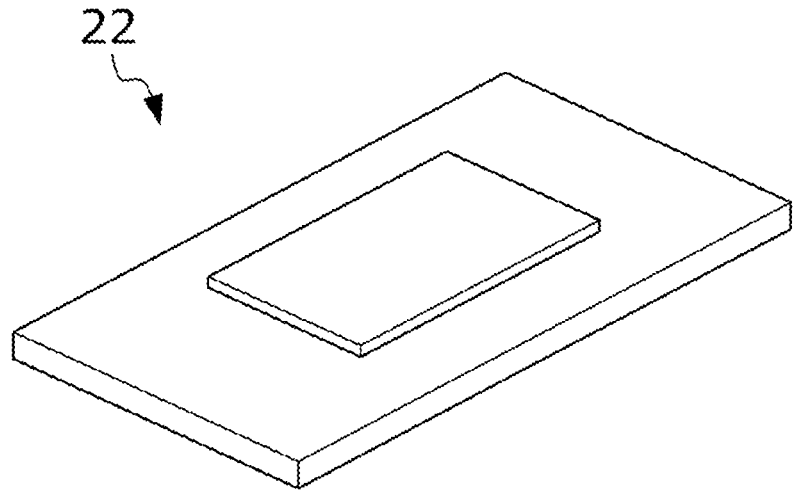
FIG. 2B is a perspective view showing a further example of a holding device.
Figure 2C:
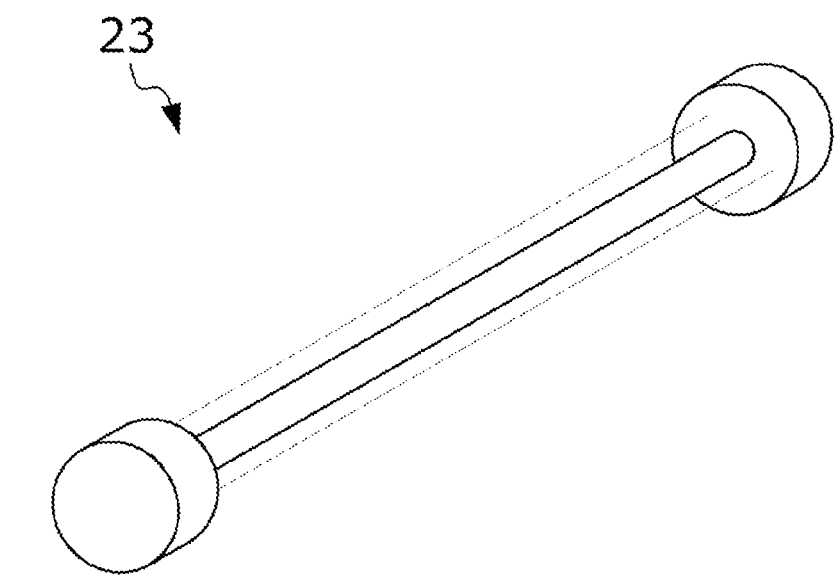
FIG. 2C is a perspective view showing an additional example of a holding device.

As described hereinafter, a microcapillary 2 having micrometer-level conduit as shown in FIG. 1 is used as a holding device to hold the liquid under test, but the holding device is not limited to this in the present invention. As a holding device to hold a liquid under test, any device is acceptable as long as the device can hold the liquid under test by capillary phenomenon as microcapillary 2 does. For example, the devices as follows may be used: a rail plate 21 on which a groove having a micrometer-level width is formed (see FIG. 2A), a pair of glass plates 22, stacked with a micrometer-level spacing (see FIG. 2B), and polymer parallel strings 23 arranged with a micrometer-level spacing (see FIG. 2C).

Laser device 3 generates, for example, laser light L having a wavelength in the range of 300 nm or more and less than 700 nm, and irradiates the irradiation area A defined inside the capillary tube of microcapillary 2 with laser light L. It is preferable that laser device 3 to be used can switch the wavelength of laser light L by using two or more wavelength values defined within a range of 300 nm or more and less than 700 nm. As described hereinafter, laser device 3 is used as a light source, but the light source is not limited to this in the present invention. For example, a light-emitting diode may be used as a light source.

Variable magnetic field applying device 5 includes a coil pad 51 that is to be held and operated by an operator, and main body 52 that generates a time-varying variable magnetic field from coil pad 51 under a predetermined setting period. In this variable magnetic field application device 5, the period and the magnetic flux density of the variable magnetic field can be set within a predetermined range. Therefore, variable magnetic field applying device 5 can also generate a static magnetic field by setting the period of the variable magnetic field to infinity. As described hereinafter, both a variable magnetic field and a static magnetic field are selectively applied to irradiation area A with laser light L inside microcapillary 2 by using variable magnetic field applying device 5, but the invention is not limited to this. In particular, as a means to generate a static magnetic field, a magnet prepared in advance separately from variable magnetic field applying device 5 may be used.

Further, as described hereinafter, as variable magnetic field applying device 5 for generating a variable magnetic field, the MRS1000 (The Magstim Company Ltd., U.K.) is used, but the invention is not limited to this case. The variable magnetic field can be applied by moving a magnet closer to or farther from irradiation area A inside microcapillary 2 by using an actuator (not shown).

Figure 3:
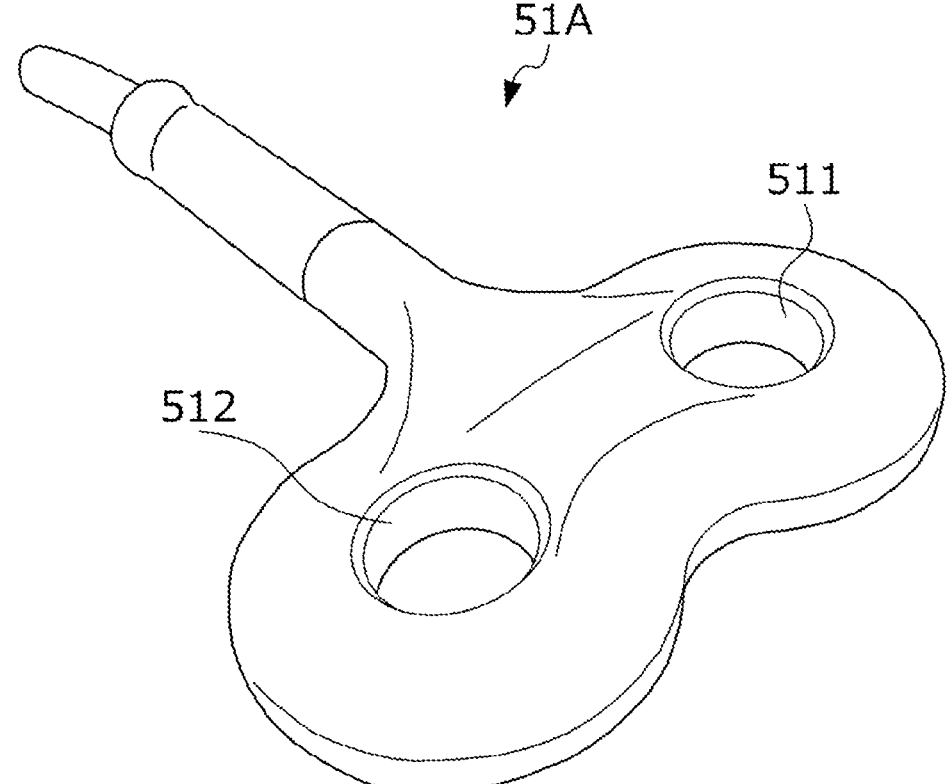
FIG. 3 is a perspective view showing a coil pad of a double coil type.

Further, FIG. 1 shows the case where a single-coil type coil pad 51 including one circular coil is used, but the present invention is not limited to this. Instead of coil pad 51, as shown in FIG. 3, a double-coil type coil pad 51A including two circular coils 511, 512 may be used. These coils 511 and 512 are slightly inclined. As a result, double-coil type coil pad 51A can improve the convergence of magnetic flux better compared with single-coil type coil pad 51, so that the magnetic flux density in irradiation area A can be selectively concentrated.

Digital microscope 6 includes an optical system (not shown) provided in the optical path of scattered light S generated from fine particles contained in the liquid under test of irradiation area A inside microcapillary 2 with laser light L, in which the scattered light S incident is received through this optical system, and an imaging device (not shown) that generates image data by converting the brightness of the scattered light S into electrical signals. The examples of the imaging devices are CCD or CMOS image sensors. The image data obtained by digital microscope 6 is transmitted to measuring device 7.

Measuring device 7 is a computer into which a program is installed, which numerically processes the image data of fine particles to measure the characteristics of the liquid under test (for example, the particle size distribution and the number concentration of fine particles such as microbubbles and solid particles dispersed in a liquid under test). The specific procedure for measuring the characteristics of the liquid under test by this measuring device 7 will be described later with reference to drawings including FIGS. 5 and 6.

Filter device 8 includes a filter main body, to which numerous filter holes having a predetermined inner diameter are provided. The inner diameter of each filter hole of the filter main body is adjusted so as to allow very fine particles in the liquid under test to pass through, and so as to capture solid particles having a large particle size in the liquid under test. Thus, allowing the liquid under test to pass through such a filter main body in advance removes the solid particles dispersed in the liquid under test having a particle size larger than the inner diameter of the filter hole. As described hereinafter, a filter main body used is positively charged so that the filter main body can also collect negatively charged microbubbles among the microbubbles dispersed in the liquid under test, but this invention is not limited to this case. The filter main body used may not be charged, or may be negatively charged.

Figure 4:
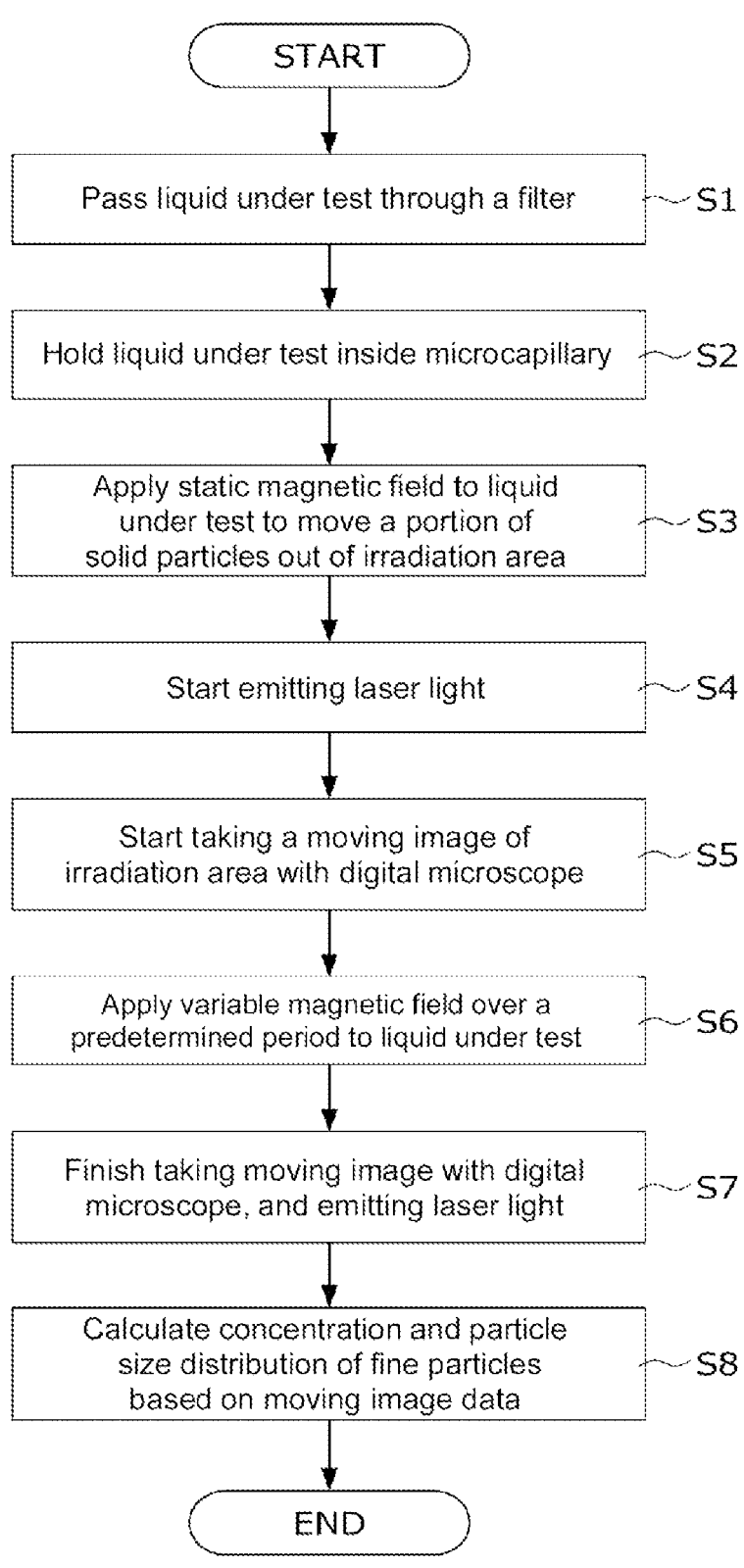
FIG. 4 is a flowchart showing a specific procedure for a measuring method to measure the characteristics of a microbubble dispersion liquid.

FIG. 4 is a flowchart showing a specific procedure of a measuring method for measuring the characteristics of the liquid under test by using measuring system 1 as described above.

First, in S1, an operator allows a liquid under test to pass through a positively charged filter main body, in which the liquid under test is a microbubble dispersion liquid prepared in advance. In this step, among the fine particles dispersed in the liquid under test, the solid particles having a large particle size, and the negatively charged microbubbles have been removed. The microbubble dispersion liquid to be used as the liquid under test may be the one prepared in advance, or the liquid may be the one manufactured by a microbubble generator (not shown).

Next, in S2, the operator allows microcapillary 2 to hold the liquid under test that has been passed through the filter main body inside thereof by capillary phenomenon.

Next, in S3, the operator operates variable magnetic field applying device 5 to generate a static magnetic field from coil pad 51 by setting the period of the variable magnetic field to infinity, and brings coil pad 51 close to microcapillary 2 to apply a static magnetic field to the liquid under test inside microcapillary 2. Further, in S3, scanning this coil pad 51 along the extending direction of microcapillary 2 is performed to move a portion of the solid particles (particularly; paramagnetic solid particles) in the liquid under test inside microcapillary 2 out of irradiation area A of laser light L. As described here, the static magnetic field is applied to the liquid under test by using variable magnetic field applying device 5, but the means for applying static magnetic field is not limited to this. For example, a static magnetic field may be applied to a liquid under test by using a magnet that is prepared separately from variable magnetic field applying device 5. The amount of solid particles collected by applying a static magnetic field to a liquid under test as described above may be measured by a known method separately.

Next, in S4, the operator starts emitting laser light L by laser device 3. More specifically, the operator operates laser device 3 to generate laser light L, and irradiates an irradiation area A predetermined inside microcapillary 2 with the laser light L.

Next, in S5, the operator starts taking a moving image of irradiation area A with digital microscope 6.

After a predetermined time has elapsed since the operator started taking the moving image in S5, next in S6, the operator uses variable magnetic field applying device 5 to apply a variable magnetic field to the liquid under test for a predetermined period of time. The period of the magnetic field variation is, for example, about 0.1 sec, and the magnetic flux density of the variable magnetic field at coil pad 51 is about 0.5-2.0 T, but the present invention is not limited to this.

Next, in S7, the operator finishes applying variable magnetic field by variable magnetic field applying device 5, and then finishes taking a moving image with digital microscope 6, and emitting laser light L by laser device 3. The above steps provide a moving image of the trajectories of multiple fine particles dispersed in the liquid under test due to Brownian motion. As described hereinafter, digital microscope 6 takes a moving image before and after the application of a variable magnetic field, but the invention is not limited to this. For example, a method to take a plurality of still images may be used during the period in which the trajectories due to Brownian motion of fine particles dispersed in the liquid under test can be tracked.

Next, in S8, the operator operates measuring device 7 to calculate the concentration and the particle size distribution of fine particles based on the moving image data of the fine particles obtained by digital microscope 6.

FIG. 5 is a flowchart showing a procedure for calculating the concentration and the particle size distribution of fine particles by measuring device 7. The liquid under test contains positively charged microbubbles, uncharged microbubbles, and nano-order fine particles including solid particles that are dispersed therein, but conventional methods including the dynamic light scattering method and the particle trajectory tracking method fail to identify such nano-order fine particles. In contrast, measuring device 7 can distinguish between positively charged microbubbles, uncharged microbubbles, and solid particles to calculate each concentration and particle size distribution thereof, as will be described in detail below. Hereinafter, before explaining the specific procedure of the flowchart of FIG. 5, the outline of the measuring method using measuring device 7 will be described with reference to FIG. 6.

Figure 6:
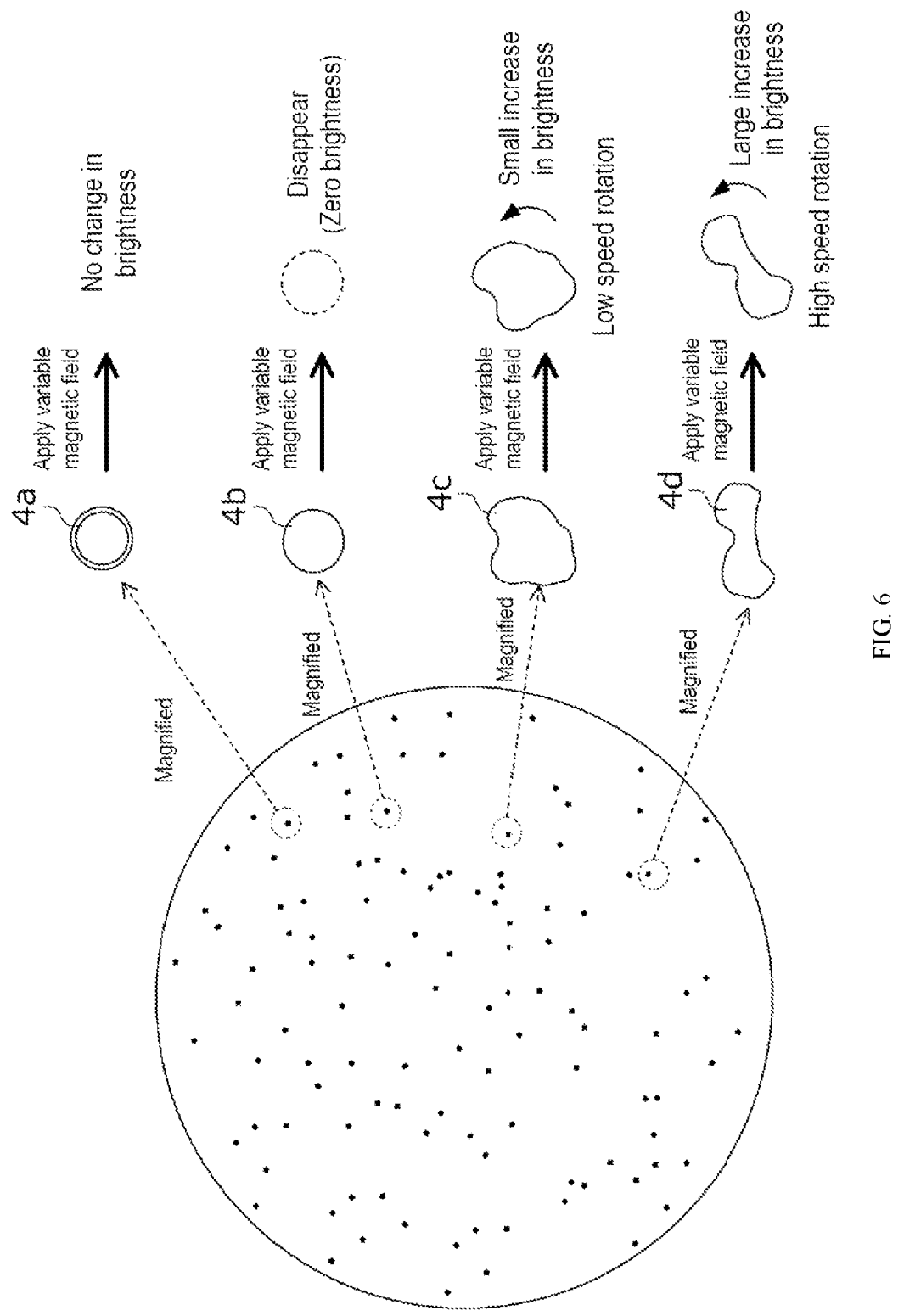
FIG. 6 is a diagram showing an example of an image of fine particles obtained by detecting scattered light of laser light with a digital microscope.

FIG. 6 is a diagram showing an example of an image of fine particles obtained by detecting scattered light of laser light with digital microscope 6. For the purpose of reference, FIG. 6 provides magnified views of some of fine particles.

As shown in FIG. 6, the liquid under test contains uncharged microbubbles 4a, charged microbubbles 4b, and solid particles 4c, 4d that are dispersed therein. In addition, solid particles of various shapes are dispersed in the liquid under test, including solid particles 4c having a shape relatively close to a true sphere, and solid particles 4d having a distorted shape far from a true sphere. However, these fine particles 4a-4d have a particle size of nano-order, which is equal to or less than the wavelength of laser light, so that those fine particles cannot be identified by the image obtained by detecting the scattered light. However, as shown in FIG. 6, the fine particles behave differently when a time-varying magnetic field that is changed under a predetermined cycle is applied to the liquid under test by variable magnetic field applying device 5.

More specifically, solid particles 4c, 4d, which have a biased magnetic permeability, undergo rotational or translational moment of force under a variable magnetic field to rotate on their axes. In this case, solid particles 4c, which have a shape relatively close to a true sphere, are considered to have less viscous resistance than solid particles 4d, which have a distorted shape, so that solid particles 4c rotate faster than solid particles 4d having a distorted shape. Therefore, if a variable magnetic field is applied to solid particles while laser light is emitted thereto, the brightness of the scattered light by solid particles 4c, 4d increases more before the variable magnetic field was applied. Also at this time, since solid particles 4d rotate faster than solid particles 4c, the brightness of solid particles 4d increases more than that of solid particles 4c. Further, such increase in the brightness considered to become bigger as the particle size of the solid particles 4c, 4d increases.

For the purpose of reference, the following formula (1) shows an equation of motion of a sphere, in which the sphere with mass M (kg) and radius r (m) has a magnetic moment m (wb·m) in a medium having a viscosity coefficient of μ (N·s/m²), and a time-varying magnetic field H (A/m) with frequency ωo (rad/s) is applied to the medium. In the formula (1), t (s) is time, and θ (rad) is the angle defined by the magnetic moment m and the magnetic field H.

Formula 1

$$\frac{2}{5}Mr^2\frac{d^2\theta}{dt^2} + mH\sin\omega_0 t\sin\theta + 8\pi\mu r^3\frac{d\theta}{dt} = 0 \tag{1}$$

In contrast, uncharged microbubbles 4a have almost no magnetic permeability, and have a very small weight compared with solid particles, which results in very large viscous resistance to the surrounding medium, whereby uncharged microbubbles 4a hardly rotate even if a variable magnetic field is applied thereto. Therefore, even if a variable magnetic field is applied to microbubbles 4a while laser light is emitted thereto, the brightness of the scattered light by microbubbles 4a hardly increases. Further, charged microbubbles 4b disappear if a variable magnetic field is applied thereto. Accordingly, if a variable magnetic field is applied to microbubbles 4b while laser light is emitted thereto, the brightness of the scattered light by charged microbubbles 4b becomes zero.

Measuring device 7 distinguishes between fine particles 4a-4d by utilizing the fact that respective fine particles 4a-4d behave differently if a variable magnetic field is applied thereto.

Hereinafter, the flowchart in FIG. 5 will be explained. First, in S11, measuring device 7 distinguishes between fine particles included in the video image into uncharged microbubble, charged microbubble, and solid particles based on the video image of the trajectories of the fine particles due to Brownian motion before and after applying a variable magnetic field. More specifically, measuring device 7 distinguishes between solid particles, charged microbubbles, and uncharged microbubble such that measuring device 7 identifies the fine particles whose brightness have increased above a predetermined threshold when a variable magnetic field is applied thereto as the solid particles, identifies the fine particles that have disappeared, and whose brightness becomes zero when a variable magnetic field is applied thereto as the charged microbubbles, and identifies the fine particles whose brightness does not increase above a predetermined threshold when a variable magnetic field is applied thereto as the uncharged microbubbles.

In this S11, if the brightness of the scattered light is insufficiently increased or saturated when a variable magnetic field is applied, it is preferable that measuring device 7 aborts the subsequent calculations, and performs the process shown in FIG. 4 again after the wavelength of the laser light by laser device 3 has been changed.

Next, in S12, measuring device 7 counts each number of the uncharged microbubbles, the charged microbubbles, and the solid particles identified in S11 in the moving image of the trajectories of fine particles due to Brownian motion before an variable magnetic field is applied thereto, by which measuring device 7 calculates the number concentration of the uncharged microbubbles $C_{bo}$, the number concentration of the charged microbubbles $C_{be}$, and the number concentration of the solid particles $C_{solid}$ in the liquid under test.

Next, in S13, measuring device 7 analyzes the trajectories of the fine particles due to Brownian motion based on the moving image of the trajectories of the fine particles due to Brownian motion before the variable magnetic field is applied thereto, by which measuring device 7 calculates the particle size of each fine particle, whose number was counted in S12, separately by the uncharged microbubbles, the charged microbubbles, and the solid particles. More specifically, the velocity due to Brownian motion of the fine particles dispersed in the liquid under test becomes slower as the particle size of the fine particles becomes larger, and becomes faster as the particle size of the fine particles becomes smaller. By analyzing the trajectories of the fine particles due to Brownian motion as described above, the particle size of each fine particle can be calculated.

Next, in S14, measuring device 7 calculates the particle size distribution $D_{bo}$ of the uncharged microbubbles, the particle size distribution $D_{be}$ of the charged microbubbles, and the particle size distribution $D_{solid}$ of the solid particles dispersed in the liquid under test by using the information of the particle size of each fine particle calculated in S13 by the uncharged microbubbles, the charged microbubbles, and the solid particles.

Second Embodiment

Next, a configuration of the measuring system 1A, to which a measuring method of a microbubble dispersion liquid according to the Second Embodiment of the present invention is applied, will be described in detail with reference to drawings.

Figure 7:
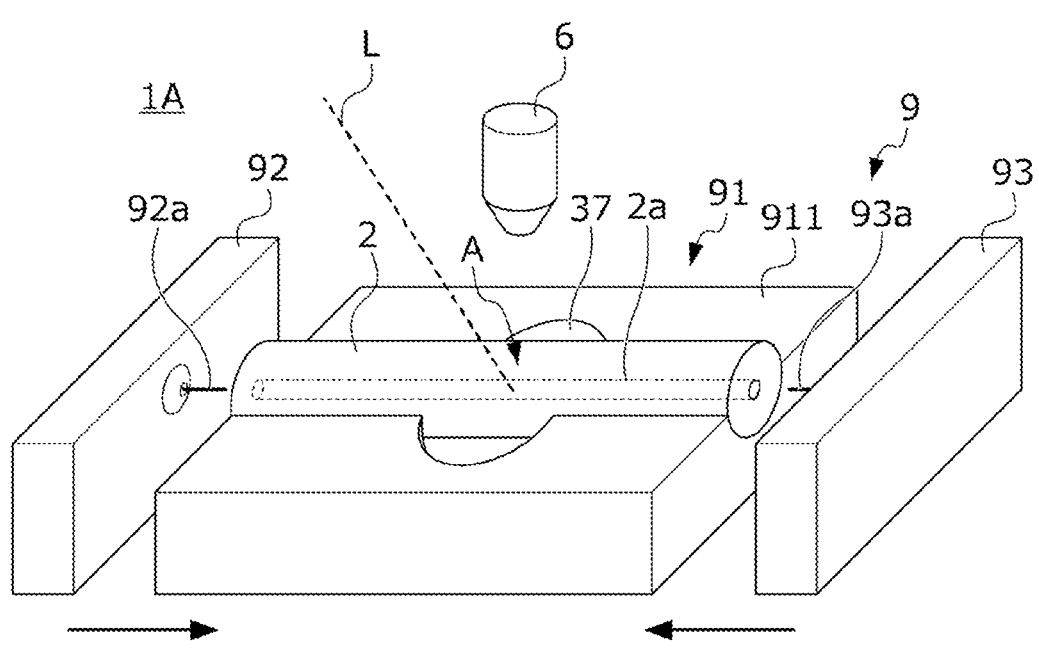
FIG. 7 is a diagram showing schematically a partial configuration of a measuring system according to the Second Embodiment of the present invention.

FIG. 7 is a diagram schematically showing a partial configuration of measuring system 1A according to this embodiment. Measuring system 1A is configured by further providing an electrophoresis device 9 to measuring system 1 according to the First Embodiment. Note that in FIG. 7, among the components of measuring system 1A, variable magnetic field applying device 5 and measuring device 7 are not shown. Hereinafter, the illustrations and detailed explanations will be omitted for the same configuration as that of measuring system 1 according to the First Embodiment.

Electrophoresis device 9 includes a holder 91 that holds microcapillary 2 horizontally, a pair of electrode support parts 92, 93 provided on both sides of microcapillary 2, and a DC power supply (not shown). The holder 91 is columnar. The upper surface 911 of holder 91 is provided with a support groove 912, which extends along the extending direction of microcapillary 2, and is arc-shaped in a sectional view. Microcapillary 2 is provided to the device 9 along support groove 912. Further, holder 91 is provided with a cutout 913, which is circular-shaped in a plan view, in the substantially center thereof, i.e., in the vicinity of the irradiation area A with laser light L.

Each surface of electrode support parts 92, 93, the surface facing microcapillary 2, is provided with electrodes 92a, 93a, which are needle-shaped. These electrodes 92a, 93a are connected to the positive electrode and the negative electrode of the DC power supply, respectively. Further, these electrode support parts 92, 93 are configured such that the parts 92, 93 can be moved closer to each other or farther apart from each other along the extending direction of microcapillary 2. If electrode support parts 92, 93 are moved closer to each other, each of electrodes 92a, 93a is inserted into each end of a conduit 2a of microcapillary 2.

Figure 8:
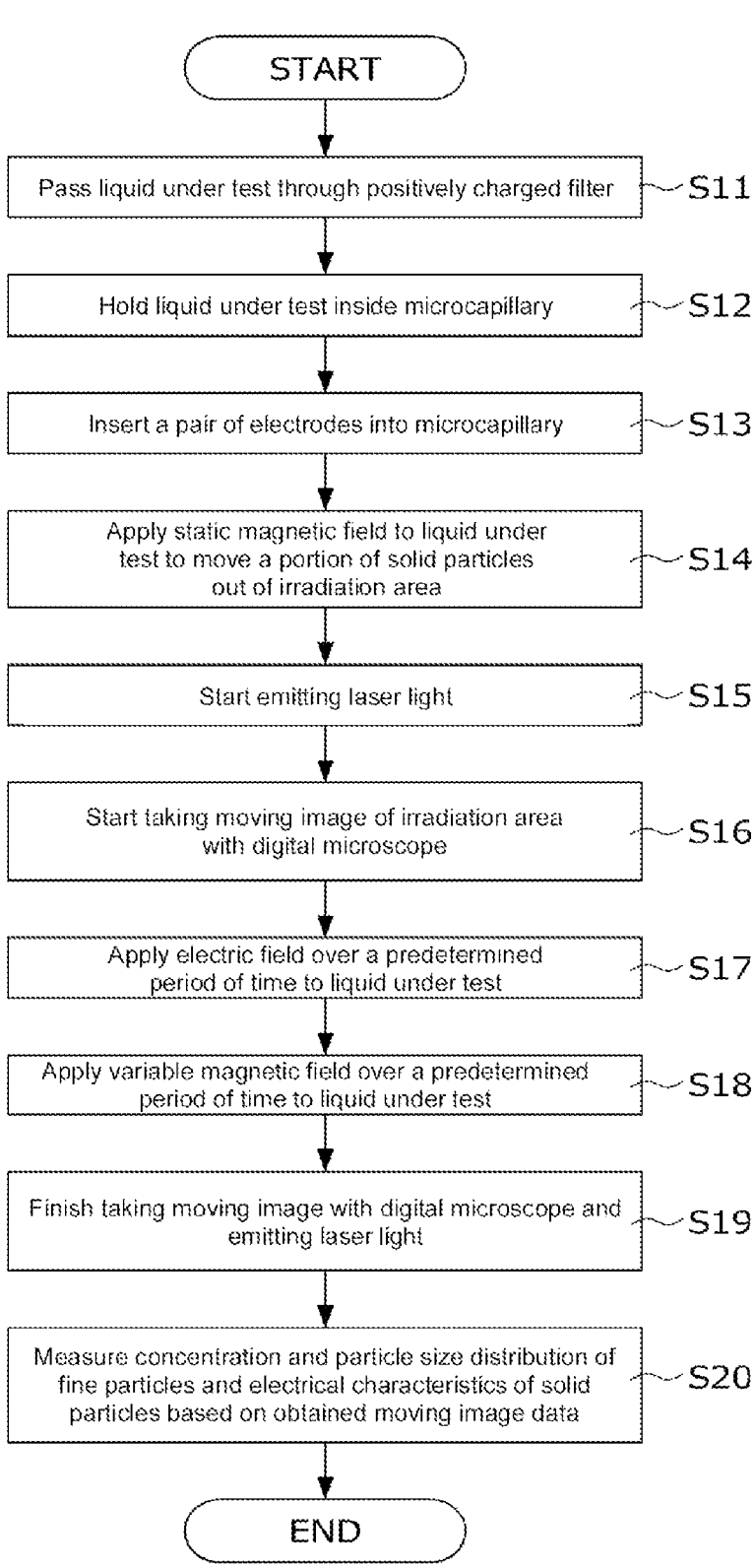
FIG. 8 is a flowchart showing a specific procedure of a measuring method to measure the characteristics of a microbubble dispersion liquid.

FIG. 8 is a flowchart showing a specific procedure of a measuring method for measuring the characteristics of the liquid under test by using measuring system 1A according to this embodiment. In the flowchart of FIG. 8, because each processing procedure of S11-S12, S14-S16, and S18-S19 is the same as that of S1-S8 in the flowchart of FIG. 4, the detailed explanation thereof is omitted.

After a liquid under test was held in microcapillary 2 in S12, an operator moves electrode support parts 92, 93 closer to each other to insert electrodes 92a, 93a into both ends of conduit 2a of microcapillary 2 in S13.

After starting taking the moving image of irradiation area A by digital microscope 6 in S16, the operator turns on the power supply connected to electrodes 92a, 93a for a predetermined period of time to apply an electric field to the liquid under test within irradiation area A located between electrodes 92a, 93a for a predetermined period of time in S17.

After finishing taking the moving image with digital microscope 6, and finishing emitting laser light L by laser device 3 in S19, the operator operates measuring device 7 to calculate the concentration and the particle size distribution of the fine particles based on the moving image data of the fine particles obtained by digital microscope 6 in S20.

The procedure in this process to distinguish between the fine particles and differentiate them into the solid particles and microbubbles based on the moving image data obtained by digital microscope 6, and to calculate the number concentration and the particle size distribution of these solid particles and microbubbles is the same as that shown in FIG. 5, so that a detailed description therefor will be omitted.

Also, according to the measuring method of this embodiment, by applying an electric field for a predetermined period of time, a moving image while an electric field is applied is acquired in S17, the moving image being that of trajectories of the fine particles due to electrophoresis while the electric field is applied thereto. Therefore, in S20, fine particles are identified as solid particles and microbubbles, and at the same time, the electrical characteristics of these solid particles are measured by analyzing the migration speed of the solid particles contained in the liquid under test based on the moving image while an electric field is applied.

Third Embodiment

Next, a configuration of the measuring system 1B, to which a measuring method of a microbubble dispersion liquid according to the Third Embodiment of the present invention is applied, will be described in detail with reference to the drawings.

Figure 9:
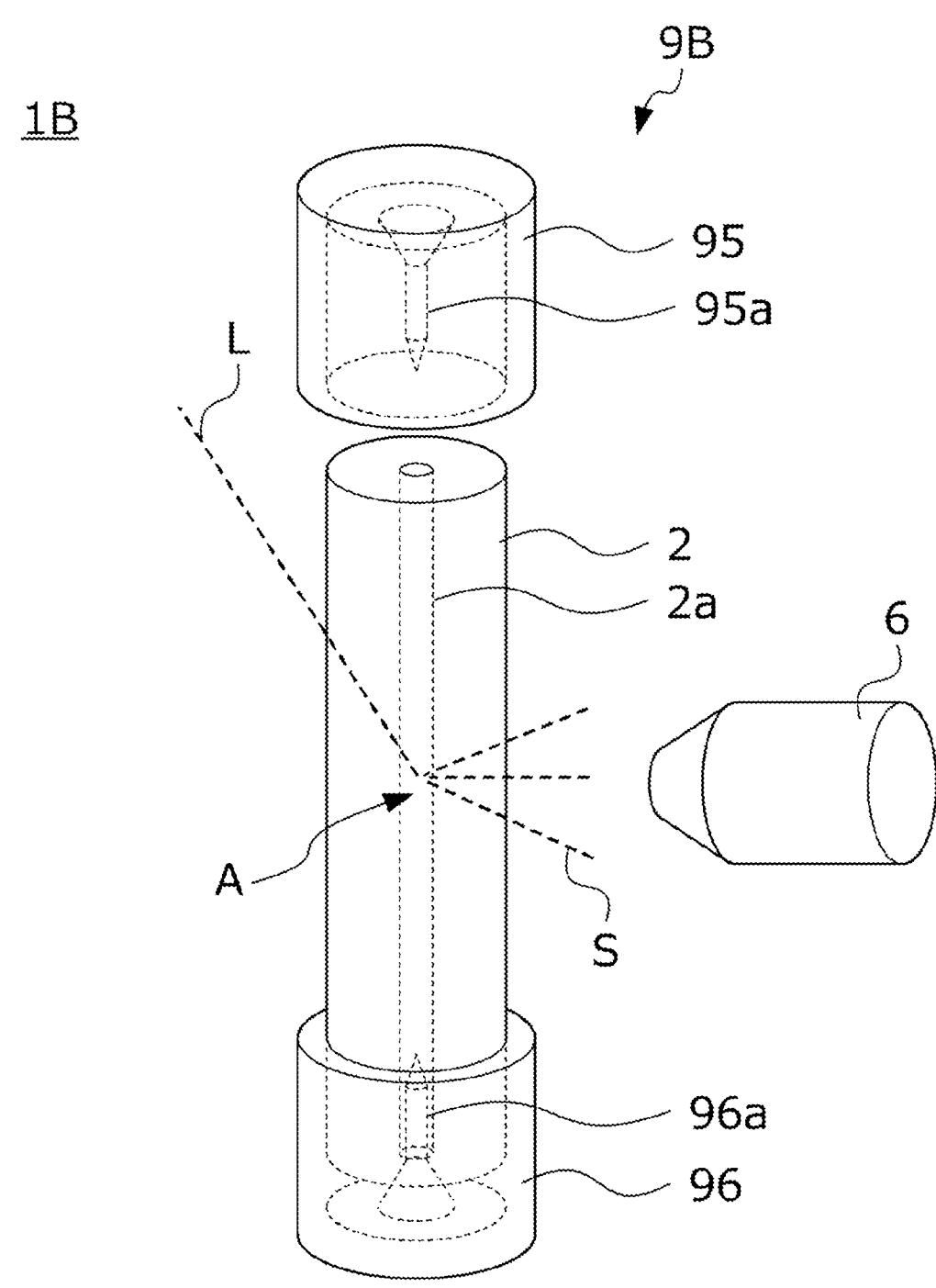
FIG. 9 is a diagram schematically showing a partial configuration of a measuring system according to the Third Embodiment of the present invention.

FIG. 9 is a diagram schematically showing a partial configuration of measuring system 1B according to this embodiment. Measuring system 1B is configured by further providing an electrophoresis device 9B to measuring system 1 according to the First Embodiment. Note that in FIG. 9, among the components of measuring system 1B, variable magnetic field applying device 5 and measuring device 7 are not shown. Hereinafter, the illustrations and detailed explanations for the same configuration as that of measuring system 1 according to the First Embodiment will be omitted.

Electrophoresis device 9B includes a pair of electrode support caps 95, 96 provided on both end sides of microcapillary 2, a stand (not shown) to hold microcapillary 2 vertically, and a power supply (not shown).

Electrode support caps 95, 96 are respectively provided with electrodes 95a, 96a, which are needle-shaped, inside thereof. Therefore, if these electrode support caps 95, 96 are fitted to both ends of microcapillary 2, each of electrodes 95a, 96a is inserted into each end of conduit 2a of microcapillary 2.

The specific procedure of the measuring method to measure the characteristics of a liquid under test by using measuring system 1B described above is the same as the procedure shown in the flowchart of FIG. 8, so that a detailed description therefor will be omitted.

Although some embodiments of the present invention were described above, the present invention is not limited to those embodiments. The details of the configuration of the embodiments may be changed as necessary within the scope of the subject matter of the invention.

For example, in First Embodiment, after the fine particles were identified as uncharged microbubbles, charged microbubbles, and solid particles based on a moving image before and after the application of a variable magnetic field (see S11 of FIG. 15), the particle size of each fine particle was calculated by analyzing the trajectories of fine particles due to Brownian motion before an variable magnetic field is applied thereto (see S13 of FIG. 5), but the method of calculating the particle size of the solid particles among the fine particles is not limited to this.

The number of rotations of solid particles when a variable magnetic field is applied correlates with the magnitude of change in the brightness of scattered light. The number of rotations of solid particles when a variable magnetic field is applied thereto also correlates with the particle size of the solid particles and the viscosity of the medium. Therefore, it is possible to calculate the particle size of the solid particles based on the magnitude of change in the brightness of scattered light by using the correlation between the magnitude of change in the brightness of scattered light, and the particle size of the solid particles and the viscosity of the medium.

More specifically, a map for calculating the particle size of solid particles as shown in FIG. 10 is to be prepared based on tests that were conducted beforehand to measure the correlation between the magnitude of the change in the brightness of scattered light before and after the application of a variable magnetic field, and the particle size of solid particles under various media having different viscosity coefficients. The magnitude of the change in brightness of scattered light by the fine particles identified as solid particles is calculated by measuring device 7 based on a moving image of the trajectories of the fine particles before and after the application of a variable magnetic field. Based on the change in the brightness of scattered light, and a viscosity coefficient of a medium inputted by an operator, the particle size is looked up in the map for calculating the particle size, by which the particle size of the solid particles can be calculated.

DESCRIPTION OF REFERENCE SIGNS

1., 1A., 1B. measuring system
2. microcapillary (holding device)
3. laser device (light source)
4a. uncharged microbubbles
4b. charged microbubbles
4c., 4d. solid particles
5. variable magnetic field applying device
51., 51A. coil pad
52. main body
6. digital microscope (light detection device)
7. measuring device
L. laser light
S. scattered light
A. irradiation area

The invention claimed is:

1. A method for measuring characteristics of a liquid under test, the liquid being a microbubble dispersion liquid, the method comprising:
   irradiating the liquid under test that is held by a holding device with an illumination light;
   applying a time-varying magnetic field to the liquid under test within an irradiation area with the illumination light;
   detecting scattered light generated from fine particles contained in the liquid under test by emission of the illumination light using a light detection device; and
   distinguishing between the fine particles into microbubbles and solid particles based on brightness of the scattered light detected by the light detection device.

2. The method according to claim 1, wherein the liquid under test contains microbubbles having a particle size in the range of 2 nm or more and less than 2000 nm.

3. The method according to claim 1, wherein the fine particles are identified as solid particles and microbubbles by comparing brightness thereof with a predetermined threshold using an image of the fine particles obtained by the light detection device.

4. A method according to claim 1, wherein in the step of detecting scattered light, an image of trajectories of the fine particles due to Brownian motion is obtained by detecting scattered light by the light detection device before and after applying a variable magnetic field, and
   wherein in the image obtained by the light detection device, the fine particles are identified as solid particles and microbubbles based on whether their brightness have been increased or not when the variable magnetic field was applied to the liquid.

5. The method according to claim 4, wherein in the image obtained by the light detection device, the fine particles whose brightness have increased when the variable magnetic field was applied to the liquid are identified as solid particles, the fine particles that have disappeared when the variable magnetic field was applied to the liquid are identified as charged microbubbles, and the fine particles whose brightness have not increased when the variable magnetic field was applied to the liquid are identified as uncharged microbubbles.

6. The method according to claim 1, further comprising measuring solid particles in which at least any of concentration and particle size distribution of solid particles contained in the liquid under test is calculated based on an image obtained by the light detection device.

7. The method according to claim 1, further comprising measuring uncharged microbubbles in which at least any of concentration and particle size distribution of uncharged microbubbles contained in the liquid under test is calculated based on an image obtained by the light detection device.

8. The method according to claim 4, further comprising measuring charged microbubbles in which in the step of detecting scattered light, both are obtained of the before-application image of trajectories of the fine particles due to Brownian motion before the variable magnetic field is applied to the liquid, and the during application image of trajectories of the fine particles due to Brownian motion while the variable magnetic field is applied to the liquid, and
   at least any of concentration and particle size distribution of the charged microbubbles contained in the liquid under test is calculated based on those images.

9. The method according to claim 8, further comprising performing a first screening of the liquid under test in which before the liquid under test is held by the holding device, the liquid under test has been passed through a positively charged filter.

10. The method according to claim 1, wherein based on the magnitude of the change in brightness of scattered light when the variable magnetic field is applied to the liquid, the particle size of the solid particles is calculated using an image of the fine particles obtained by the light detection device.

11. The method according to claim 1, further comprising applying an electric field to the liquid under test in which the electric field is applied to the liquid under test within the irradiation area with the illumination light, wherein in the step of detecting scattered light, a during-application image is obtained of trajectories of the fine particles due to electrophoresis while the electric field is applied to the liquid, and the properties of the solid particles contained in the liquid under test are measured based on the during-application image.

12. The method according to claim 1, further comprising performing a second screening in which before the variable magnetic field is applied to the liquid under test, a static magnetic field is applied to the liquid, by which at least a portion of the solid particles is moved out of the irradiation area.

13. The method according to claim 12, further comprising measuring an amount of paramagnetic substance in which the amount of paramagnetic solid particles is measured, the solid particles being collected in the step of performing the second screening by applying the static magnetic field to the liquid under test.

14. The method according to claim 1, wherein a light source of the illumination light is a laser device, and the laser device is capable of switching the wavelength of laser light L by using two or more wavelength values defined within a range of 300 nm or more and less than 700 nm.

15. A measuring system for measuring characteristics of a liquid under test, the liquid being a microbubble dispersion liquid, the system comprising:

a holding device that holds a liquid under test;

a light source that irradiates the liquid under test held by the holding device with illumination light;

a variable magnetic field applying device that applies a time-varying magnetic field to the liquid under test within an irradiation area with the illumination light;

a light detection device that detects scattered light generated from fine particles contained in the liquid under test by irradiation with the illumination light; and a measuring device that measures characteristics of the liquid under test by distinguishing between the fine particles between microbubbles and solid particles based on brightness of the scattered light that was detected by the light detection device.

\* \* \* \* \*